United States Patent
Halbauer

(10) Patent No.: US 10,202,015 B2
(45) Date of Patent: Feb. 12, 2019

(54) VEHICLE TWIST AXLE ASSEMBLY

(71) Applicant: MAGNA INTERNATIONAL INC., Aurora, Ontario (CA)

(72) Inventor: Johannes Peter Halbauer, Theresienfeld (AT)

(73) Assignee: MAGNA INTERNATIONAL INC., Aurora, Ontario (CA)

( * ) Notice: Subject to any disclaimer, the term of this patent is extended or adjusted under 35 U.S.C. 154(b) by 0 days.

(21) Appl. No.: 15/532,849

(22) PCT Filed: Dec. 3, 2015

(86) PCT No.: PCT/CA2015/000591
§ 371 (c)(1),
(2) Date: Jun. 2, 2017

(87) PCT Pub. No.: WO2016/086291
PCT Pub. Date: Jun. 9, 2016

(65) Prior Publication Data
US 2017/0355244 A1     Dec. 14, 2017

Related U.S. Application Data

(60) Provisional application No. 62/086,816, filed on Dec. 3, 2014.

(51) Int. Cl.
*B60G 21/05* (2006.01)
*B21D 53/88* (2006.01)

(52) U.S. Cl.
CPC .......... *B60G 21/052* (2013.01); *B21D 53/88* (2013.01); *B60G 21/051* (2013.01);
(Continued)

(58) Field of Classification Search
CPC .............. B60G 21/052; B60G 2200/21; B60G 2206/20
See application file for complete search history.

(56) References Cited

U.S. PATENT DOCUMENTS 5,909,888 A * 6/1999 Betz ..................... B60G 21/051
280/124.166
6,487,886 B2   12/2002 Ueno et al.
(Continued)

FOREIGN PATENT DOCUMENTS

DE    102009004441 A1 *  7/2010  .......... B60G 21/051
EP          2923865 A2      9/2015
(Continued)

OTHER PUBLICATIONS

Arnaud Lizot, Rear axle i.e. H-shaped axel, for motor vehicle, has cross-piece and arms formed from stamped metal sheet as single piece, where arms are respectively provided with wheel mounting supports at its ends, Feb. 17, 2012, EPO, FR 2963754 A1, Machine Translation of Description (Year: 2012).*
(Continued)

*Primary Examiner* — James A English
(74) *Attorney, Agent, or Firm* — Dickinson Wright PLLC

(57) ABSTRACT

The twist axle assembly includes a twist beam which is made of a single integral piece, extends along a length between opposite ends and the twist beam has an open cross-sectional shape between the ends. The twist beam is stamped into a U-shape with a middle section that extends in a first direction between a pair of trailing arm sections. The trailing arm sections extend at least partially in a second direction that is generally transverse to the first direction to reduce twisting stresses within the trailing arm portions during operation of the twist axle assembly.

13 Claims, 7 Drawing Sheets

(52) U.S. Cl.
CPC ...... *B60G 2200/20* (2013.01); *B60G 2200/21* (2013.01); *B60G 2206/20* (2013.01)

(56) References Cited

U.S. PATENT DOCUMENTS

| | | | |
|---|---|---|---|
| 7,204,498 B2* | 4/2007 | Alesso | B60B 35/007 |
| | | | 280/124.106 |
| 9,895,950 B2* | 2/2018 | Matsuda | B60G 21/051 |
| 2013/0214504 A1* | 8/2013 | Ohdo | B60G 21/051 |
| | | | 280/124.106 |

FOREIGN PATENT DOCUMENTS

| | | |
|---|---|---|
| FR | 2963754 A1 | 2/2012 |
| JP | 2013220731 A | 10/2013 |
| WO | 2011111543 A1 | 9/2011 |

OTHER PUBLICATIONS

Schultz et al., Motor vehicle axle and method for the manufacture of a crossbeam for an axle of a motor vehicle, Sep. 30, 2015, EPO, EP 2 923 865 A2, Machine Translation of Description (Year: 2015).*

* cited by examiner ically, the opposite ends of the twist beam and the trailing arms are interconnected with one another via welding, and the weld joints are typically located forwardly of the portions of the trailing arms which are connected with the wheels of the vehicle. However, during use, this configuration has the effect of subjecting the weld joints to large moments and thus to large stresses. There remains a need to reduce the stresses applied to the weld joints of such twist axle assemblies.

SUMMARY OF THE INVENTION AND ADVANTAGES

One aspect of the present invention provides for a twist axle assembly is provided. The twist axle assembly includes a twist beam which is made of a single integral piece, extends along a length between opposite ends and the twist beam has an open cross-sectional shape between the ends. The twist beam is stamped into a U-shape with a middle section that extends in a first direction between a pair of trailing arm sections. The trailing arm sections extend at least partially in a second direction that is generally transverse to the first direction to reduce twisting stresses within the trailing arm portions during operation of the twist axle assembly.

According to another aspect of the present invention, at least one component is welded to the portion of at least one of the trailing arm sections that extends in the second direction. Because a weld joint between the component and the twist beam is located on the portion of the trailing arm section that extends in the second direction, it encounters reduced bending stresses and has improved durability as compared to the weld joints between components and twist beams of other known twist axle assemblies.

According to yet another aspect of the present invention, the at least one component welded to the twist beam is a wheel carrier.

According to still another aspect of the present invention, the at least one component welded to the twist beam is a body mount.

According to a further aspect of the present invention, a pair of closeout plates are joined with the trailing arm sections of the twist beam to at least partially close the open cross-sectional shapes of the trailing arm sections to increase the torsional stiffnessess of the trailing arm sections.

According to yet another aspect of the present invention, each of the closeout plates includes a transition portion for gradually increasing the torsional stiffness of the twist beam from the middle section to each of the trailing arm sections.

According to still another aspect of the present invention, the trailing arm sections are curved from the first direction to the second direction.

According to another aspect of the present invention, the twist axle assembly further includes a spring seat that is integrally connected as one piece with the twist beam.

Another aspect of the present invention provides for a method of making a twist axle assembly. The method includes the steps of preparing a workpiece and stamping the workpiece into a single piece twist beam with a U-shaped configuration which presents a middle section and a pair of trailing arm sections. The middle section extends in a first direction, and the trailing arm sections extend at least partially in a second direction that is generally transverse to the first direction.

According to a further aspect of the present invention, the method further includes the step of welding at least one component to the portion of at least one of the trailing arm sections that extends in the second direction. According to one aspect of the present invention, the component is a wheel carrier. According to another aspect of the present invention, the component is a body mount.

According to yet another aspect of the present invention, the step of stamping the workpiece further creates at least one spring seat integrally connected with at least one of the trailing arm sections of the twist beam.

According to still another aspect of the present invention, the twist beam has an open cross-sectional shape along a length thereof and the method further includes the step of engaging at least one closeout plate with at least one of the trailing arm sections of the twist beam to close the cross-sectional shape of the at least one trailing arm section.

According to a further aspect of the present invention, the closeout plate includes a transitional feature for gradually increasing a torsional stiffness of the twist beam from the middle section to the at least one trailing arm section,

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
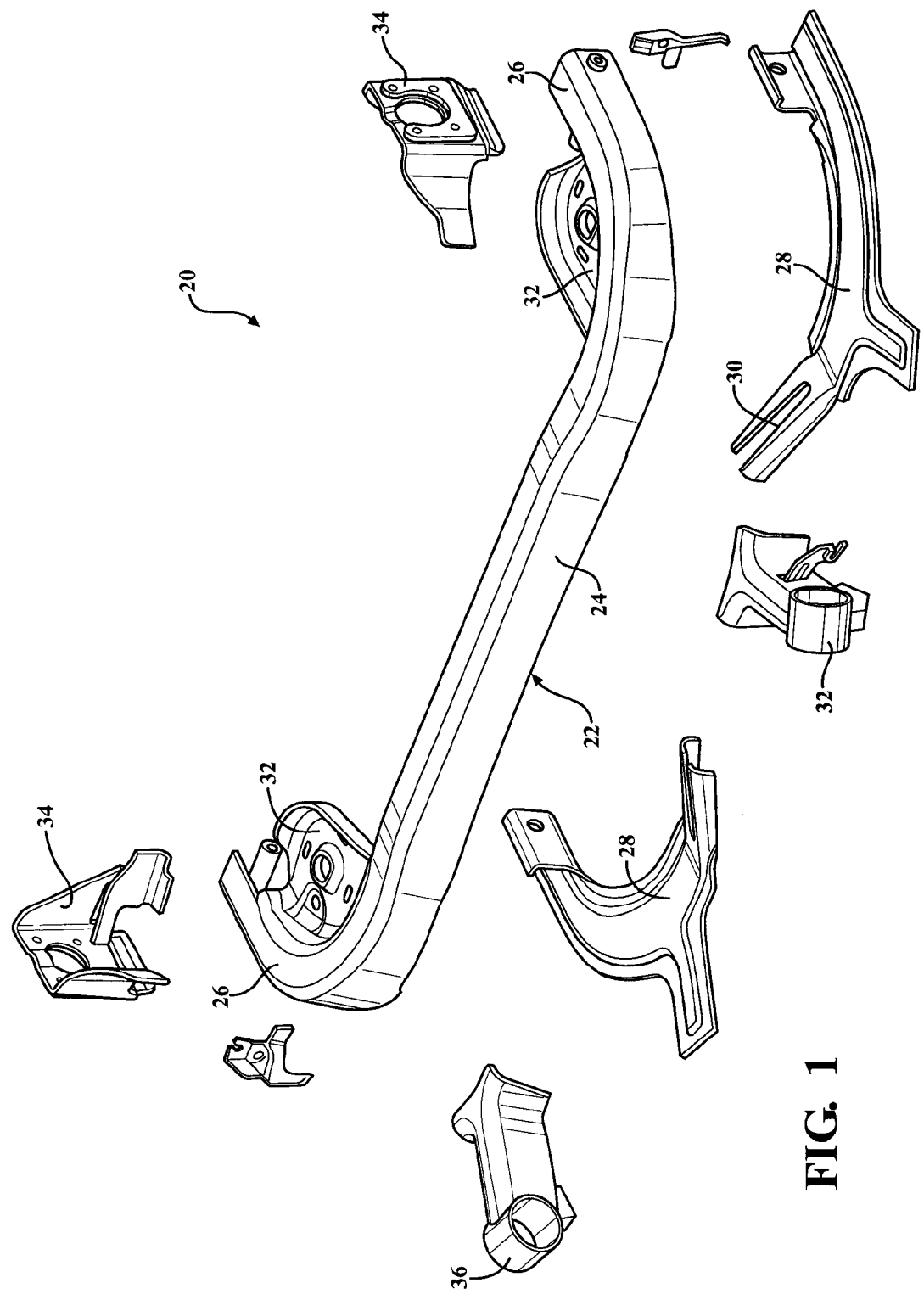
FIG. 1 is an exploded view of an exemplary embodiment of a twist axle assembly for a vehicle suspension system.
Figure 2:
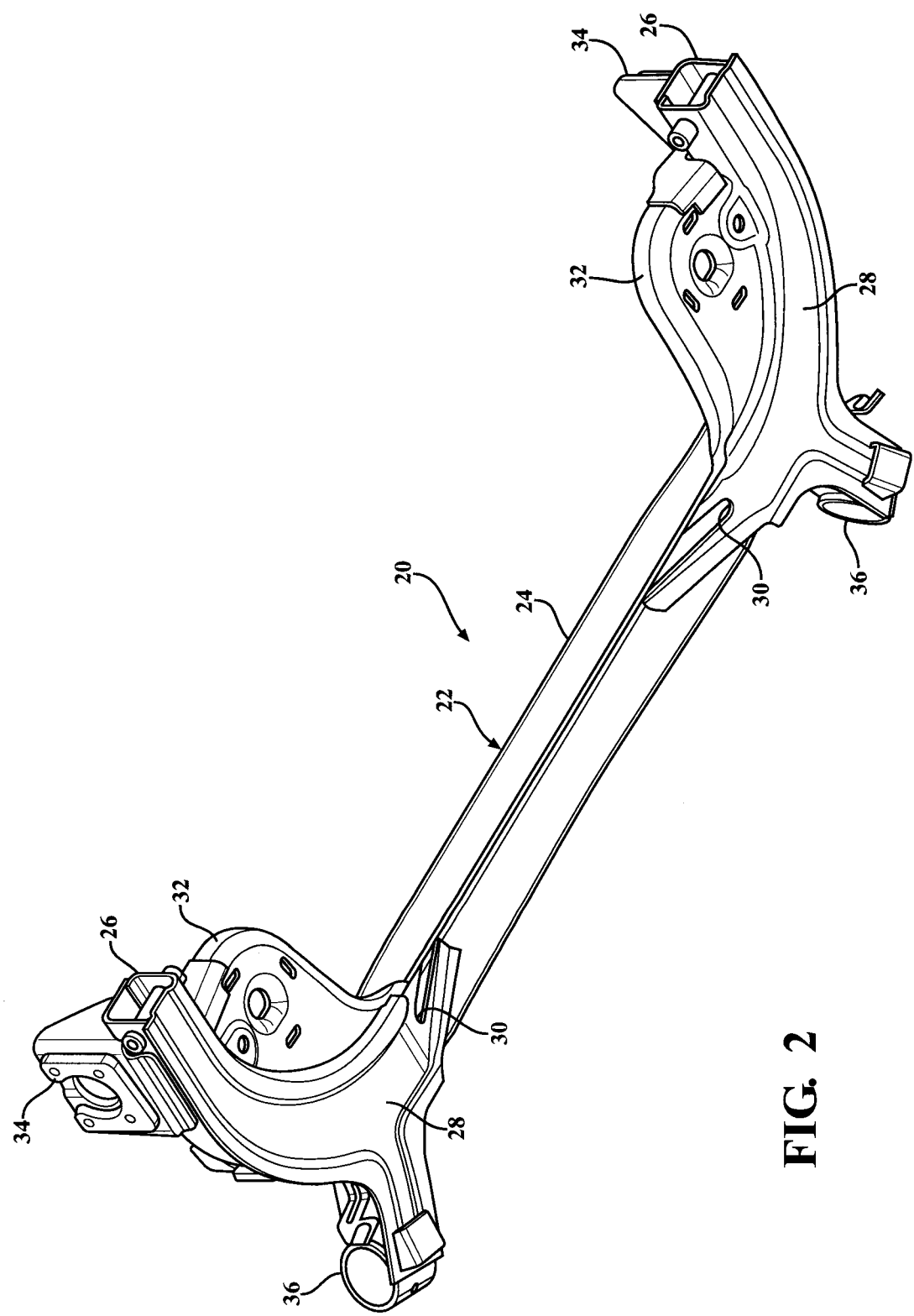
FIG. 2 is an isometric view of the twist axle assembly of FIG. 1.
Figure 3:
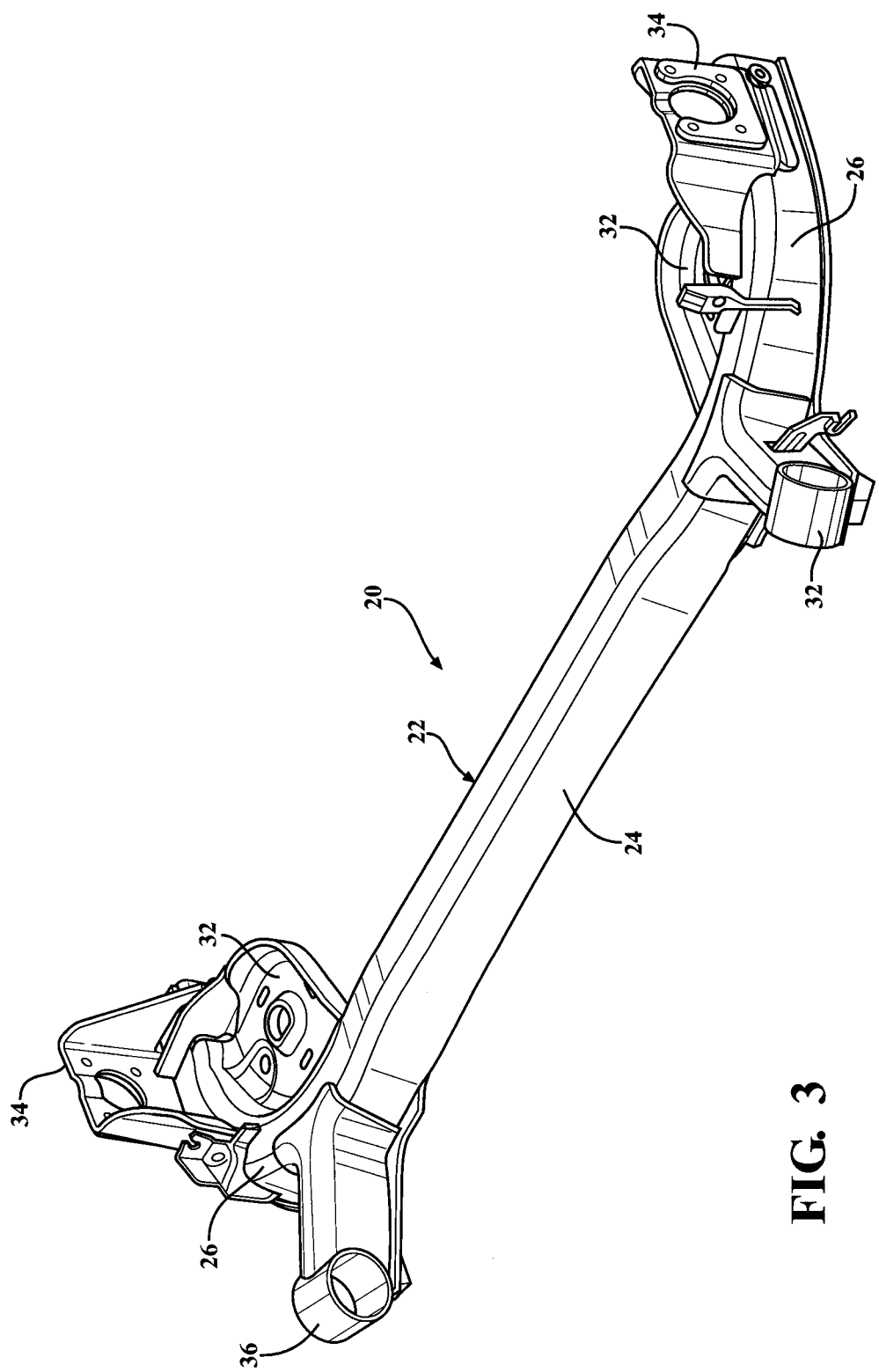
FIG. 3 is an isometric view of the twist axle assembly of FIG. 1 taken from a different vantage point than the isometric view of FIG. 2.
Figure 4:
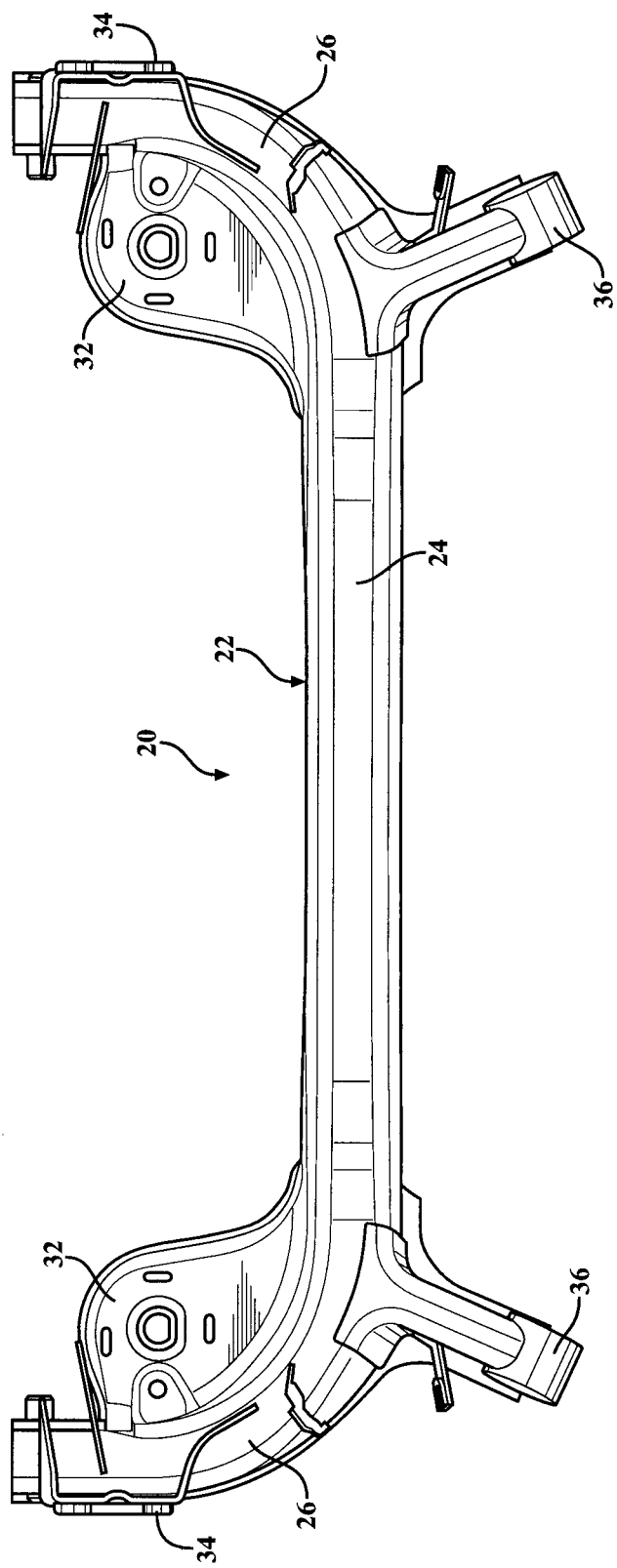
FIG. 4 is a top elevation view of the twist axle assembly of FIG. 1.
Figure 5:
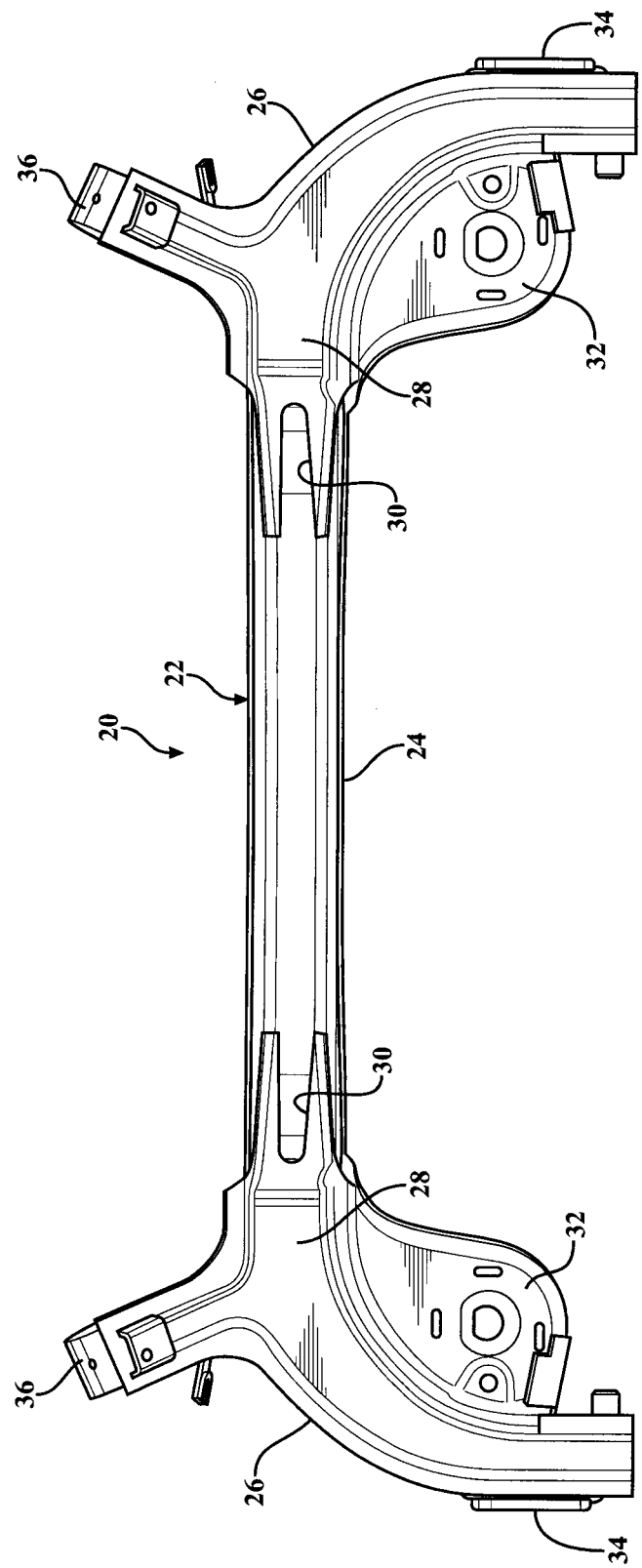
FIG. 5 is a bottom elevation view of the twist axle assembly of FIG. 1.
Figure 6:
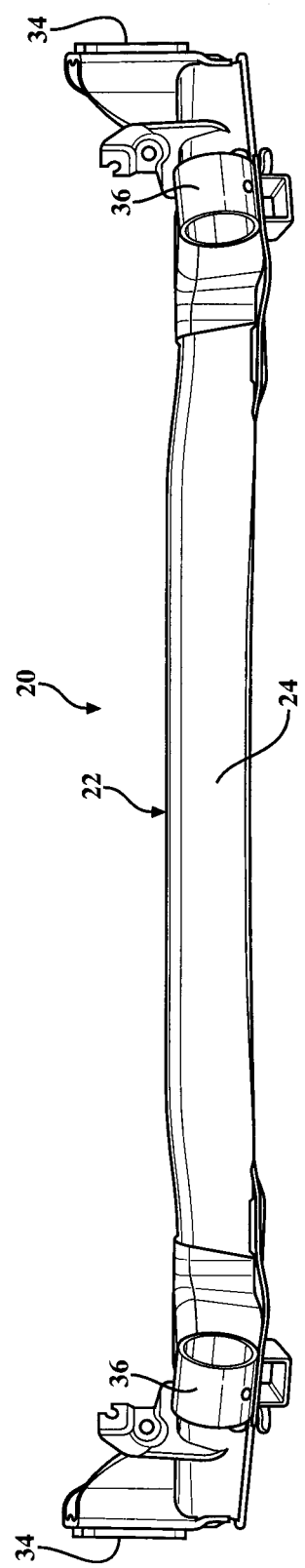
FIG. 6 is a front elevation view of the twist axle assembly of FIG. 1.
Figure 7:
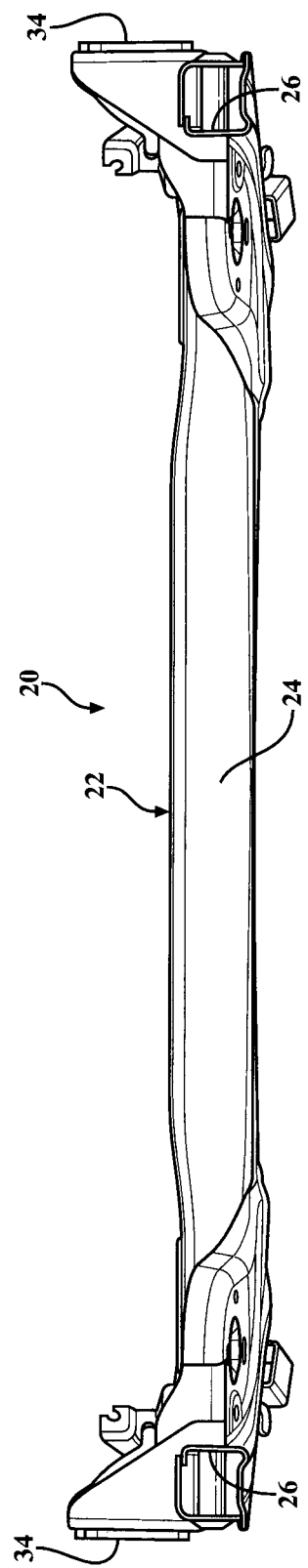
FIG. 7 is a back elevation view of the twist axle assembly of FIG. 1.

Referring to the Figures, wherein like numerals indicate corresponding parts throughout the several views, a first exemplary embodiment of an improved twist axle assembly 20 for suspension system of a vehicle is generally shown in FIGS. 1-7.

The twist axle assembly 20 includes a twist beam 22 (also known as a cross-member) which is generally U-shaped when viewed from above or below (see FIGS. 4 and 5) and extends between opposite ends. That is, the twist beam 22 has a middle section 24 which extends in a first direction and a pair of trailing arm sections 26 which at least partially in a second direction that is generally perpendicular or transverse to the first direction. Hereinafter, the first direction is referred to as a "lateral" direction and the second direction is referred to as a "longitudinal direction" to reflect the orientation of the twist beam 22 when it is installed in the vehicle. Each of the trailing arm sections 26 is curved from the lateral direction of the middle section 24 to the longitudinal direction. The twist beam 22 is preferably made of metal, such as steel, an alloy steel, aluminum, an aluminum alloy, magnesium or a magnesium alloy.

During operation of the vehicle, the trailing arm sections 26 are operably connected with wheels and rotate relative to one another in response to body roll and in response to the wheels encountering objects in the road, such as pot holes. The middle section 24 twists to absorb energy in response to the relative rotation between the trailing arm sections 26 to resiliently resist the rotation between the trailing arm sections 26.

The twist beam 22 is of a single integral piece and, taken by itself, has an open cross-section along its length between the trailing arm sections 26. Specifically, the exemplary twist beam has a U-shape with a top wall and two side walls which extend along the length. The open cross-sectional shape provides the twist beam 20 the twist beam 22 with a relatively low twisting resistance, which is ideal for the middle section 24 but less desirable for the trailing arm sections 26. In order to increase the twisting resistance of the twist beam 22 in the trailing arm sections 26, the twist axle assembly 20 is provided with a pair of closeout plates 28 which are attached with the twist beam 22 (for example, through fasteners and/or welding) and which close the cross-sectional shape of the twist beam 22 at the trailing arm sections 26. Each of the closeout plates 28 extends through a curve which follows the bend in the associated trailing arm section 26 of the twist beam 22. Adjacent the middle section 24, the closeout plate 28 includes a transition feature with a ramped shape and which has a generally U-shaped opening 30 formed therein for gradually increasing the twisting stiffness of the twist beam 22 from the middle section 24 to the trailing arm sections 26. As such, the torsional stiffness of the twist beam 22 gradually increases from the middle section 24 to the longitudinally extending portions of the trailing arm sections 26. The closeout plates 28 are made as separate pieces from the one-piece twist beam 22.

When installed in the vehicle, the twist beam 22 is oriented such that the trailing arm sections 26 are curved in a rearward longitudinal direction (towards a back of the vehicle). In the exemplary embodiment, a spring seat 32 is formed integrally with each trailing arm section 26 at the longitudinally extending portion. The spring seat 32 is shaped to support one end of a spring (not shown) for absorbing energy in response to rotation of the associated trailing arm section 26 relative to a vehicle frame.

A wheel carrier 34 is attached with the longitudinally extending portion of each trailing arm section 26 via a weld joint. The wheel carrier 34 is configured for attachment to a hub (not shown) of a wheel assembly. During operation of the vehicle, forces are transmitted from the wheel carriers 34 through the weld joints and into the associated trailing arm section 26 of the twist beam 22 to cause the middle section 24 to elastically twist. Because the weld joints are with the longitudinally extending portions of the trailing arm sections 26 of the twist beam 22, they are subjected to reduced moments and stresses as compared to weld joints between twist beams and trailing arms of other known twist axle assemblies. This allows for improved durability and reliability in the twist axle assembly 20. The weld joints between the wheel carrier 34 and the body mount 36 could be made through, for example, metal inert gas (MIG), gas metal arc welding (GMAW) or laser welding.

Although the spring seats 32 are formed integrally with the twist beam 22 in the exemplary embodiment, it should be appreciated that the spring seats could alternately be initially made as separate pieces from the twist beam and subsequently joined with the twist beam through welding.

The twist axle assembly 20 further includes a pair of body mounts 36 which are welded to the trailing arm sections 26 of the twist beam 22 and extend longitudinally forward therefrom. Each of the body mounts 36 includes a bearing sleeve (not shown) for receiving a portion of a vehicle unibody (not shown) to interconnect the twist axle assembly 20 with the vehicle body.

As shown, the wheel carriers 34 and the body mounts 36 are formed as separate pieces from one another and from the twist beam 22. Each of the wheel carriers 34 and the body mounts 36 includes at least one surface which is shaped similarly to the outer surface of the trailing arm sections 26 of the twist beam 22 to facilitate elongated weld joints between these components and the twist beam 22. These surfaces could be shaped to provide for so-called "glove" fitting connections with the twist beam 22.

Another aspect of the present invention provides for a method of making a twist axle assembly 20, such as the exemplary embodiment shown in FIGS. 1-7. The method starts with the step of preparing a workpiece, such as a sheet of metal. The method continues with the step of stamping the workpiece into a single piece twist beam 22 which has a U-shaped configuration. The stamping process could include one or more stamping procedures. The as-stamped twist beam 22 presents a middle section 24 that extends in a first direction and a pair of trailing arm sections 26 that extend at least partially in a second direction that is generally transverse to the first direction. The stamping procedure may also create a pair of spring seats 32 which are integrally connected as one piece with the trailing arm sections 26. The exemplary method continues with the step of welding a plurality of components to the portions of the trailing arm sections 26 that extend in the second direction. Specifically, a wheel carrier 34 and a body mount 36 are welded to each of the trailing arm sections 26. The exemplary twist beam 22 has an open cross-sectional shape along a length thereof, and the method proceeds with the step of engaging closeout plates 28 with the trailing arm sections 26 of the twist beam 22 to close the cross-sectional shapes of the trailing arm sections 26, thereby increasing the torsional stiffnesses of the trailing arm sections 26. The exemplary closeout plates 28 include transitional features for gradually increasing the torsional stiffness of the twist beam 22 from the middle section 24 to the trailing arm sections 26.

Obviously, many modifications and variations of the present invention are possible in light of the above teachings and may be practiced otherwise than as specifically described while within the scope of the appended claims.

What is claimed is:

1. A twist axle assembly for a vehicle, comprising:
    twist beam of a single integral piece and extending along a length between opposite ends and having an open cross-sectional shape between said ends;
    the twist beam being stamped into a U-shape with a middle section which extends in a first direction between a pair of trailing arm sections and wherein each of said trailing arm sections extends at least partially in a second direction that is generally transverse to said first direction to reduce twisting stresses within said trailing arm sections during operation of said twist axle assembly;
    a pair of closeout plates joined with said trailing arm sections of said twist beam to close said open cross-sectional shapes of said trailing arm sections; and
    each of said closeout plates extending through a curve from one of said ends of said twist beam to said middle section to at least partially close only a portion of said open cross-sectional shape in said middle section.

2. The twist axle assembly as set forth in claim 1 further including at least one component welded to the portion of at least one of said trailing arm sections that extends in said second direction.

3. The twist axle assembly as set forth in claim 2 wherein said at least one component welded to at least one of said trailing arm sections is a wheel carrier.

4. The twist axle assembly as set forth in claim 2 wherein said at least one component welded to at least one of said trailing arm sections is a body mount.

5. The twist axle assembly as set forth in claim 1 wherein each of said closeout plates includes a transition portion which has a U-shaped opening for gradually increasing the torsional stiffness of said twist beam from said middle section to each of said trailing arm sections.

6. The twist axle assembly as set forth in claim 1 wherein said trailing arm sections are curved from said first direction to said second direction.

7. The twist axle assembly as set forth in claim 1 further including a spring seat that is integrally connected as one piece with said twist beam.

8. A method of making a twist axle assembly, comprising the steps of:
    preparing a workpiece;
    stamping the workpiece into a single piece twist beam with a U-shaped configuration which presents a middle section that extends in a first direction and a pair of trailing arm sections that extend at least partially in a second direction that is generally transverse to the first direction, wherein the twist beam has an open cross-sectional shape along a length thereof; and
    fixedly attaching closeout plates with the twist beam to close the open cross-sectional shapes of the trailing arm sections and wherein each of the closeout plates extends through a curve to at least partially close only a portion of the open cross-sectional shape in the middle section.

9. The method as set forth in claim 8 further including the step of welding at least one component to the portion of at least one of the trailing arm sections of the twist beam that extends in the second direction.

10. The method as set forth in claim 9 wherein the step of welding at least one component to at least one of the trailing arm sections of the twist beam is further defined as welding at least one wheel carrier to at least one of the trailing arm sections of the twist beam.

11. The method as set forth in claim 9 wherein the step of welding at least one component to at least one of the trailing arm sections of the twist beam is further defined as welding at least one body mount to at least one of the trailing arm sections of the twist beam.

12. The method as set forth in claim 8 wherein the step of stamping the workpiece further creates at least one spring seat integrally connected with at least one of the trailing arm sections of the twist beam.

13. The method as set forth in claim 8 wherein the closeout plate includes a transitional feature which includes a U-shaped opening for gradually increasing a torsional stiffness of the twist beam from the middle section to the at least one trailing arm section.

* * * * *